United States Patent
Tay et al.

(10) Patent No.: US 6,200,023 B1
(45) Date of Patent: Mar. 13, 2001

(54) METHOD FOR DETERMINING THE TEMPERATURE IN A THERMAL PROCESSING CHAMBER

(75) Inventors: Sing Pin Tay, Fremont; Yao Zhi Hu; Randhir P. S. Thakur, both of San Jose, all of CA (US)

(73) Assignee: Steag RTP Systems, Inc., San Jose, CA (US)

(*) Notice: Subject to any disclaimer, the term of this patent is extended or adjusted under 35 U.S.C. 154(b) by 0 days.

(21) Appl. No.: 09/270,475

(22) Filed: Mar. 15, 1999

(51) Int. Cl.⁷ .......................... G01K 11/00; G01K 15/00
(52) U.S. Cl. .................. 374/161; 374/1; 374/137; 374/141; 374/142; 374/159; 374/187
(58) Field of Search ................. 374/1, 101, 102, 374/110, 120, 137, 141, 142, 159, 161, 187; 219/494; 438/7, 16

(56) References Cited

U.S. PATENT DOCUMENTS

| | | | |
|---|---|---|---|
| 5,265,957 | * 11/1993 | Moslehi et al. | 374/1 |
| 5,364,187 | 11/1994 | Thakur et al. | |
| 5,994,676 | * 11/1999 | Dutartre | 374/102 |
| 6,126,744 | * 10/2000 | Hawkins et al. | 374/162 |

FOREIGN PATENT DOCUMENTS

| | | |
|---|---|---|
| 3803336 | 8/1989 | (DE). |
| 0451514 A2 | 10/1991 | (EP). |
| 0451514 A3 | 10/1991 | (EP). |

OTHER PUBLICATIONS

Timans, et al.; "Regrowth Rates of Amorphous Layers in Silicon–on–Sapphire Films"; pp. 123–130; Mat. Res. Soc. Symp. Proc. vol. 52, 1986 Materials Research Society.

England, et al.; "Time–resolved reflectivity measurements of temperature distributions during swept–line electron–beam heating of silicon"; pp. 389–397; J. Appl. Phys. 70(1), Jul. 1, 1991 American Institute of Physics.

Article by Jeffrey C. Gelpey, Paul D. Stump, Junian Blake, Alvin Michel and Werner Rausch entitled "Uniformity Characterization of An RTP System", Amsterdam, LN, XP–000885199 (pp. 612–617), Nuclear Instruments and Methods in Physics Research B21, 1987.

* cited by examiner

*Primary Examiner*—Diego Gutierrez
*Assistant Examiner*—Stanley J. Pruchnic, Jr.
(74) *Attorney, Agent, or Firm*—Dority & Manning, P.A.

(57) ABSTRACT

A system and method for determining the temperature of substrates in a thermal processing chamber in the presence of either an oxidizing atmosphere or a reducing atmosphere is disclosed. Specifically, temperature determinations made in accordance with the present invention are generally for calibrating other temperature sensing devices that may be used in conjunction with the thermal processing chamber. The method of the present invention is generally directed to heating a substrate containing a reactive coating within a thermal processing chamber in an oxidizing atmosphere or reducing atmosphere. As the wafer is heated, the reactive coating reacts with gases contained within the chamber based upon the temperature to which the substrate is exposed. After heated, the thickness of any coating that is formed on the substrate is then measured for determining the temperature to which the substrate was heated. This information can then be used to calibrate other temperature sensing devices, such as thermocouples and pyrometers.

35 Claims, 5 Drawing Sheets

METHOD FOR DETERMINING THE TEMPERATURE IN A THERMAL PROCESSING CHAMBER

FIELD OF THE INVENTION

The present invention is generally directed to a method for determining the temperature in a thermal processing chamber. In one embodiment, the method for determining the temperature within the thermal processing chamber is used to calibrate temperature sensing devices contained within the chamber. The method of the present invention is particularly well suited for making temperature determinations in a thermal processing chamber containing either an oxidizing atmosphere or a reducing atmosphere.

BACKGROUND OF THE INVENTION

A thermal processing chamber as used herein refers to a device that rapidly heats objects, such as semiconductor wafers. Such devices typically include a substrate holder for holding one or more semiconductor wafers and a light source that emits light energy for heating the wafers. During heat treatment, the semiconductor wafers are heated under controlled conditions according to a preset temperature regime. During heating, various processes can be carried out within the thermal processing chamber, such as rapid thermal oxidation, nitridation, annealing, silicidation, sintering, and metallization.

Many semiconductor heating processes require a wafer to be heated to high temperatures so that the various chemical and physical transformations can take place as the wafer is fabricated into a device. During rapid thermal processing, for instance, semiconductor wafers are typically heated by an array of lights to temperatures from about 300° C. to about 1,200° C., for times which are typically less than a few minutes. During these processes, one main goal is to heat the wafers as uniformly as possible.

During the rapid thermal processing of a semiconductor wafer, it is desirable to monitor and control the wafer temperature. In particular, for all of the high temperature wafer processes of current and foreseeable interest, it is important that the true temperature of the wafer be determined with high accuracy, repeatability and speed. The ability to accurately measure the temperature of a wafer has a direct payoff in the quality and size of the manufactured integrated circuit. For instance, the smallest feature size required for a given semiconductor device limits the computing speed of the finished microchip. The feature size in turn is linked to the ability to measure and control the temperature of the device during processing.

One of the most significant challenges in wafer heating systems is the ability to accurately measure the temperature of substrates during the heating process. In the past, various means and devices for measuring the temperature of substrates in thermal processing chambers have been developed. Such devices include, for instance, pyrometers, thermocouples that directly contact the substrate or that are placed adjacent to the substrate, and the use of laser interference.

In order to use each of the above devices in a thermal processing chamber, the devices generally need to be calibrated. Consequently, various calibration procedures also exist in order to align the temperature readings of the devices with some absolute and accurate temperature reference. The current state of the art and the most widely used method to calibrate temperature devices in thermal processing chambers is to place in the chambers a semiconductor wafer having a thermocouple embedded in the wafer. The temperature measurements taken from the thermocouple is compared with the temperature readings received from the temperature measuring devices and any discrepancy is calibrated out.

Another method that has been used in the past to calibrate temperature sensing devices contained within thermal processing chambers is to heat a substrate within the chamber that undergoes a chemical or physical transformation when heated to a particular temperature. By observing or measuring the chemical or physical transformation that occurs, the temperature to which the substrate was heated can be accurately determined which can then be used to calibrate other temperature sensing devices contained within the chamber. For example, in one embodiment, silicon oxidation can be carried out within the chamber by heating a silicon substrate. The amount or extent of oxidation that occurs when the substrate is heated indicates the temperature to which the substrate was exposed. Besides silicon oxidation, other calibration methods include ion implant activation, such as As+ implant or $BF_2$+ implant, and silicidation of refractory metals, such as titanium and cobalt.

Although the above methods offer various advantages over the use of a thermocouple embedded within a semiconductor wafer for calibrating temperature sensing devices, the above calibration methods are generally only useful in higher temperature ranges and have not been used to calibrate temperature sensing devices at temperatures less than about 500° C. Currently, more and more processes are being conducted at lower temperatures creating a need for accurate and precise temperature measurements within lower temperature ranges. As such, a need currently exists for an improved process for calibrating temperature sensing devices contained within thermal processing chambers. In particular, a need exists for a process for calibrating temperature sensing devices at lower temperatures and when various gases are being circulated through the chamber.

SUMMARY OF THE INVENTION

The present invention recognizes and addresses the foregoing disadvantages and others of prior art constructions and methods.

Accordingly, it is an object of the present invention to provide an improved system and process for measuring the temperature of semiconductor wafers in thermal processing chambers.

Another object of the present invention is to provide a process for calibrating temperature sensing devices contained within thermal processing chambers.

It is another object of the present invention to calibrate temperature sensing devices in thermal processing chambers at lower temperatures and in the presence of oxidizing or reducing gases.

Still another object of the present invention to calibrate temperature sensing devices in thermal processing chambers when the chambers are designed to contain steam during heating processes.

Another object of the present invention is to provide a process for determining the temperature in a thermal processing chamber using a substrate having a copper surface that forms a copper oxide coating during heating and wherein the thickness of the copper oxide coating indicates the temperature within the chamber.

These and other objects of the present invention are achieved by providing a process for measuring the temperature of substrates in a thermal processing chamber. The process includes the steps of placing a substrate in a thermal processing chamber. In one embodiment of the present invention, the substrate includes a surface made from a material comprising copper. For instance, the substrate can be a semiconductor wafer made from a material such as silicon. A copper coating can be adhered to the semiconductor wafer. The copper coating can have a thickness, for instance, of at least 2,000 angstroms, and particularly from about 2,000 angstroms to about 1 micron.

Once placed within the thermal processing chamber, the substrate is heated for a determined interval of time in the presence of an oxidizing atmosphere. In particular, the substrate is heated to a predetermined maximum temperature very rapidly and maintained at that temperature for a period of time. The temperature to which the substrate is heated should be sufficient for a coating of oxidized copper to form on the surface of the substrate.

According to the present invention, in order to determine the temperature to which the substrate was heated, the thickness of the oxidized coating is then measured. The thickness of the oxidized coating can be measured according to various methods, such as using spectroscopic ellipsometry. Based upon the thickness of the oxidized copper coating, a temperature can be determined.

It is believed that the process of the present invention can be used with various different types of thermal processing chambers. In one preferred embodiment, the thermal processing chamber used in accordance with the process of the present invention includes a plurality of light energy sources which are designed to heat the wafers placed in the chamber. As described above, in this embodiment of the present invention, the process is designed to indicate the temperature in a thermal processing chamber when the chamber contains an oxidizing environment. For instance, the present invention is well suited to determining the temperature of substrates in a thermal processing chamber when such gases such as steam, oxygen, and/or nitrogen oxides are present within the chamber. These gases may be circulated through the chamber in order to carry out various processes during the construction of an integrated circuit. These gases, however, can interfere with temperature measurements being conducted inside the chamber. The present invention is designed to account for any such discrepancies and can therefore be used to calibrate temperature sensing devices contained within the chamber.

For instance, by determining the temperature of the substrate according to the above process, temperature sensing devices contained within the chamber can be calibrated based upon the temperature that is determined from the thickness of the oxidized coating. The temperature sensing device contained within the thermal processing chamber can be, for instance, a thermocouple and/or a pyrometer. Of particular advantage, it has been discovered that the process of the present invention is particularly well suited to calibrating temperature sensing devices at temperatures less than 600° C., and particularly less than about 500° C.

Besides being used to calibrate temperature sensing devices, the process of the present invention can also be used to determine whether a substrate placed in the chamber is heated uniformly. For instance, the thickness of the oxidized copper coating can be determined at a plurality of locations on the substrate. If the thickness of the coating is constant over the surface of the substrate, then the substrate is being heated uniformly. If, however, the thickness of the coating varies, that may indicate that the substrate is not being heated evenly across its surface. If such is the case, based upon measurements taken according to the present invention, the heating device used in conjunction with the thermal processing chamber can be adjusted and modified accordingly. For instance, if light energy sources are being used to heat substrates within the chamber, the irradiance distribution of the light energy sources can be adjusted in order to more uniformly heat substrates.

Besides being used to measure temperatures in an oxidizing atmosphere, an alternative embodiment of the present invention is directed to a process for measuring temperatures in a reducing atmosphere. In this embodiment, instead of containing a copper coating, the substrate placed in the thermal processing chamber contains an oxidized copper coating. When heated in a reducing atmosphere, the oxidized copper coating reduces to copper which in turn reduces the thickness of the coating. Measuring the reduction of thickness in the oxidized copper coating can then be used to determine the temperature to which the substrate was heated. Similar to the embodiment described above, the process is particularly well suited for determining temperatures of less than about 600° C. The reducing atmosphere under which the process is carried out can be created by feeding to the processing chamber a reducing gas such as hydrogen. Hydrogen gas is commonly circulated through thermal processing chambers in order to carry out various processes on semiconductor wafers. Such processes include, for instance, sintering and metallization.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
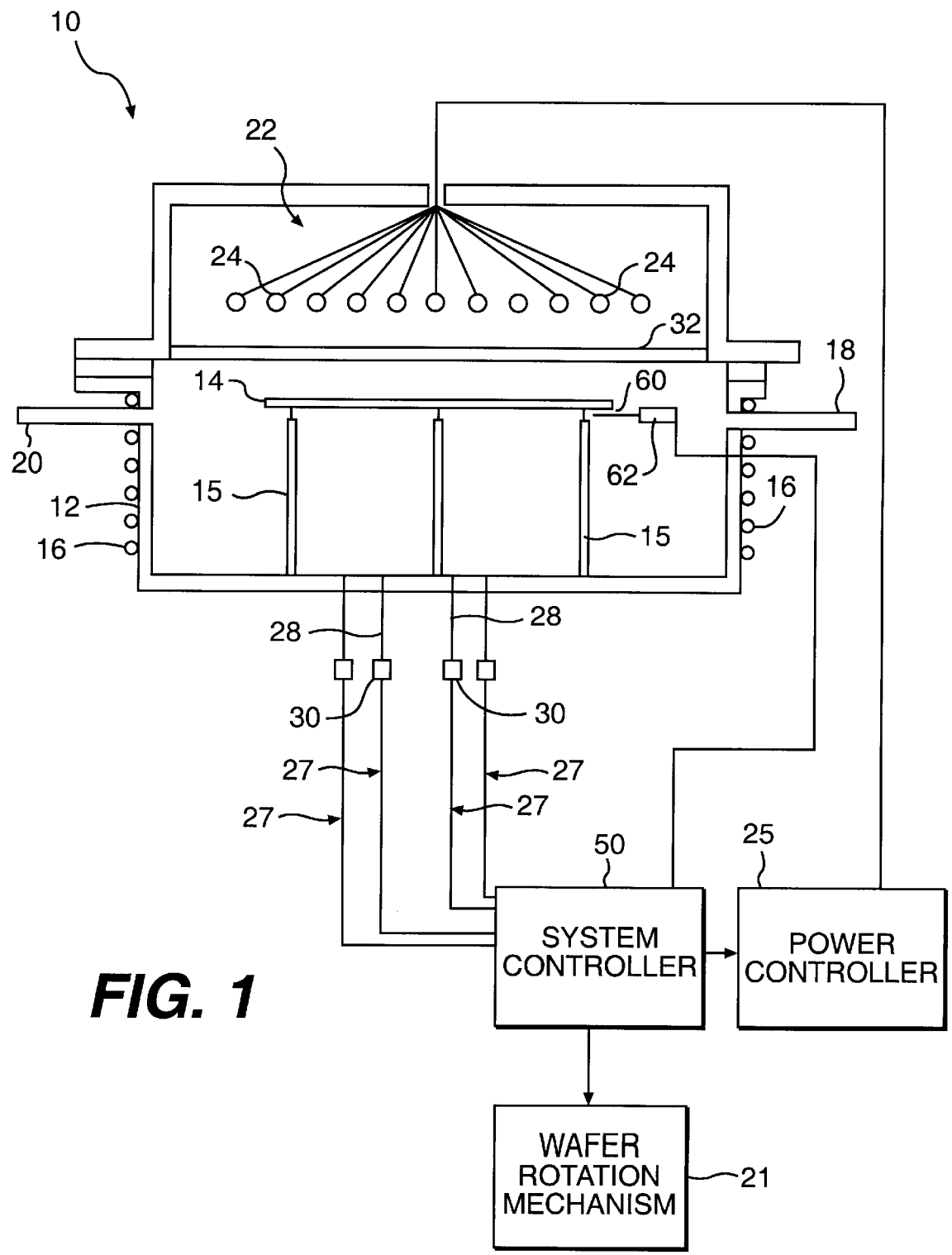
FIG. 1 is a cross-sectional view of an exemplary embodiment of a thermal processing chamber that may be used in accordance with the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a method and to a system for determining the temperature of an object, particularly a semiconductor wafer, in a thermal processing chamber during heat treatment. The system of the present invention is particularly well suited to determining the temperature of semiconductor wafers in an oxidizing or reducing atmosphere at relatively lower temperatures, such as less than about 600° C. The process of the present invention has been found to produce very accurate temperature measurements which can then be used to calibrate other temperature sensing devices found within the thermal processing chamber. The present invention can also provide information as to the degree of temperature uniformity that is achieved when a semiconductor wafer is heated. This information can be used to make adjustments and changes in the equipment that is used to heat the wafer.

In order to determine the temperature of an object in a thermal processing chamber according to the present invention, a substrate having a reactive coating is placed within the chamber. For instance, in one embodiment, the substrate can be a silicon wafer having a copper coating adhered to one surface of the wafer. Once placed in the thermal processing chamber, the coated substrate is heated in an oxidizing atmosphere which partially oxidizes the copper coating. The copper oxide thickness is then measured using a suitable device. Because copper oxide growth is temperature dependent, a temperature can then be determined and calculated based upon the thickness of the copper oxide, which can then be used to calibrate other temperature sensing devices contained within the chamber. Further, the copper oxide thickness uniformity across the wafer can be translated into temperature uniformity across the wafer.

In an alternative embodiment, the substrate can be pre-coated with a copper oxide coating and the substrate can be heated in a reducing atmosphere as opposed to an oxidizing atmosphere. In a reducing atmosphere, copper oxide is converted into copper causing the thickness of the copper oxide coating to be reduced. By measuring the reduction in the thickness of the copper oxide coating, a temperature to which the substrate was heated can be accurately determined.

Various different processes are carried out in thermal processing chambers such as oxidation, nitridation, annealing, metallization, sintering, silicidation, and other various processes. In each of these processes, not only is the operating temperature varied, but also various different gases are circulated through the chamber. It is well known that the reaction ambient or, in other words, the particular gases that are circulated through the chamber can drastically influence the temperature of a substrate and the rate at which the substrate is heated. The process of the present invention is directed to determining temperatures in thermal processing chambers in the presence of various different types of gases. This temperature information can then be used to calibrate temperature sensing devices found within the chamber which are used to monitor the temperature of wafers in the chamber.

In accordance with the present invention, when calibrating a temperature sensing device found within the chamber, preferably the process of the present invention is carried out as close as possible to actual process conditions. In this manner, accurate and reliable temperature information is generated which can then be used to calibrate temperature instruments within the chamber for the particular process.

As will be made apparent from the following description, the system of the present invention offers many advantages over prior art constructions. For instance, the process of the present invention can be used not only to determine a wide range of temperatures, but is also particularly well suited to monitoring relatively low temperatures, such as less than about 600° C. Further, the process is very reliable, simple and accurate. Finally, as described above, the system of the present invention, besides being used to determine temperatures within thermal processing chambers, is also well suited to determining whether objects within the chamber are being heated uniformly.

Referring to FIG. 1, for exemplary purposes only, one embodiment of a thermal processing system 10 for heat treating one or more wafers made from a semiconductive material, such as silicon, is illustrated. System 10 includes a processing chamber 12 adapted to receive substrates such as a wafer 14 for conducting various processes. As shown, wafer 14 is positioned on a substrate holder 15 made from a thermal insulating material such as quartz. Chamber 12 is designed to heat wafer 14 at very rapid rates and under carefully controlled conditions. Chamber 12 can be made from various materials, including metals and ceramics. For instance, chamber 12 can be made from stainless steel or quartz.

When chamber 12 is made from a heat conductive material, preferably the chamber includes a cooling system. For instance, as shown in FIG. 1, chamber 12 includes a cooling conduit 16 wrapped around the perimeter of the chamber. Conduit 16 is adapted to circulate a cooling fluid, such as water, which is used to maintain the walls of chamber 12 at a constant temperature.

Chamber 12 can also include a gas inlet 18 and a gas outlet 20 for introducing a gas into the chamber and/or for maintaining the chamber within a preset pressure range. For instance, a gas can be introduced into chamber 12 through gas inlet 18 for reaction with wafer 14. Once processed, the gas can then be evacuated from the chamber using gas outlet 20.

Alternatively, an inert gas can be fed to chamber 12 through gas inlet 18 for preventing any unwanted or undesirable side reactions from occurring within the chamber. In a further embodiment, gas inlet 18 and gas outlet 20 can be used to pressurize chamber 12. A vacuum can also be created in chamber 12 when desired, using gas outlet 20 or an additional larger outlet positioned beneath the level of the wafer.

During processing, substrate holder 15, in one embodiment, can be adapted to rotate wafer 14 using a wafer rotation mechanism 21. Rotating the wafer promotes greater temperature uniformity over the surface of the wafer and promotes enhanced contact between wafer 14 and any gases introduced into the chamber. It should be understood, however, that besides wafers, chamber 12 is also adapted to process optical parts, films, fibers, ribbons, and other substrates having any particular shape.

A heat source or heating device generally 22 is included in communication with chamber 12 for heating wafer 14 during processing. Heating device 22 includes a plurality of lamps 24, such as tungsten-halogen lamps. As shown in FIG. 1, lamps 24 are placed above wafer 14. It should be understood, however, that lamps 24 may be placed at any particular location. Further, additional lamps could be included within system 10 if desired, such as below wafer 14.

The use of lamps 24 as a heat source is generally preferred. For instance, lamps have much higher heating and cooling rates than other heating devices, such as electrical elements or conventional furnaces. Lamps 24 create a rapid isothermal processing system that provide instantaneous energy, typically requiring a very short and well controlled start up period. The flow of energy from lamps 24 can also be abruptly stopped at any time. As shown in the figure, lamps 24 are equipped with a gradual power controller 25 that can be used to increase or decrease the thermal energy being emitted by the lamps.

As shown in FIG. 1, in this embodiment, system 10 includes a window 32 which is positioned between lamps 24 and thermal processing chamber 12. Window 32 serves to isolate lamps 24 from wafer 14 and prevent contamination of the chamber.

In order to monitor the temperature of wafer 14 during the heating process, thermal processing chamber 12 can include various different and multiple temperature sensing devices. For instance, as shown in FIG. 1, thermal processing chamber 12 can include a thermocouple 60 contained within a thermocouple holder 62. Thermocouple 60 can be positioned adjacent to semiconductor wafer 14 or, alternatively, can be placed in direct contact with the wafer. Thermocouple 60 directly measures the temperature of the wafer during heating.

Besides using thermocouple 60 or in addition to using thermocouple 60, system 10 can also include one or more radiation sensing devices 27 for monitoring the temperature of wafer 14 during thermal processing. The use of radiation sensing devices for monitoring the temperature of wafer 14 is particularly well suited for applications in which the emissivity of the wafer is known and at temperatures where the wafer is substantially opaque, which is usually at relatively high temperatures.

Radiation sensing devices 27 include optical fibers or light pipes 28 which are, in turn, in communication with corresponding light detectors 30. Optical fibers 28 are configured to receive thermal energy being emitted by wafer 14 at a particular wavelength. The amount of sensed radiation is then communicated to light detectors 30 which generate a usable voltage signal for determining the temperature of the wafer which can be calculated based, in part, on Planck's Law. In one embodiment, each optical fiber 28 in combination with a light detector 30 comprises a pyrometer.

Besides using thermocouples and radiation sensing devices, other temperature sensing devices may be included within the chamber of the present invention without limitation.

As shown in FIG. 1, system 10 can further includes a system controller 50 which can be, for instance, a microprocessor. Controller 50 can be placed in communication with thermocouple 60 and light detectors 30. In particular, controller 50 is configured to receive voltage signals from the temperature sensing devices indicating the temperature of wafer 14.

System controller 50 as shown in FIG. 1 can also be in communication with lamp power controller 25. In this arrangement, controller 50 can determine the temperature of wafer 14, and, based on this information, control the amount of thermal energy being emitted by lamps 24. In this manner, instantaneous adjustments can be made regarding the conditions within reactor 12 for processing wafer 14 within carefully controlled limits.

In one embodiment, controller 50 can also be used to automatically control other elements within the system. For instance, controller 50 can be used to control the flow rate of gases entering chamber 12 through gas inlet 18. As shown, controller 50 can further be used to control the rate at which wafer 14 is rotated within the chamber.

For system 10 to operate efficiently and correctly, it is important that the temperature sensing devices contained within the thermal processing chamber accurately measure the temperature of the semiconductor wafer as it is being heated. In this regard, the temperature sensing devices should be calibrated to ensure that they are accurately monitoring the temperature of the wafer. In particular, the temperature sensing devices preferably are calibrated for each different type of process that is being carried out in the chamber. As described above, for instance, circulating different gases within the chamber can have dramatic effects upon the temperature of the wafer.

The process of the present invention is directed to accurately determining the temperature of a substrate in order to calibrate the temperature sensing devices and in order to ensure that the wafer is being heated uniformly. In particular, the process of the present invention is directed to determining the temperature of a substrate within the chamber in either an oxidizing atmosphere or a reducing atmosphere.

For instance, when monitoring the temperature of substrates in an oxidizing atmosphere, the process of the present invention is directed to the use of a substrate having a surface made from copper. When placed in a thermal processing chamber and heated in the presence of an oxidizing gas, the copper surface partially oxidizes to form a copper oxide. The amount of copper oxide that forms in a fixed amount of time is directly related to the temperature to which the substrate is heated. Thus, in accordance with the present invention, by measuring the thickness of the copper oxide coating that forms, the temperature to which the substrate was heated can be accurately determined. This temperature can then be used to calibrate the temperature sensing devices that are present within the thermal processing chamber.

The substrate used in accordance with the present invention preferably has a shape similar to a semiconductor wafer. The substrate can be made entirely from copper, but preferably only includes a copper coating. For instance, in one embodiment, the substrate can be made from the same material as the semiconductor wafer to be processed within the chamber, such as silicon. A copper coating can be adhered to the wafer. For most applications, the copper coating should be at least 2,000 angstroms thick, and particularly from about 2,000 angstroms to about 1 micron thick. The actual thickness of the coating used, however, will depend upon the temperature to which the substrate is heated, the process being carried out in the chamber, and the length of time the wafer is to be heated.

In order to adhere the copper coating to the semiconductor wafer, if desired, an adhesive can be used. In one embodiment, the adhesive can also serve as an impurity barrier in order to prevent the copper coating from contaminating the semiconductor material used to make the wafer to which the copper coating is adhered. Examples of adhesives that may be used in accordance with the present invention include titanium nitride (TiN), Tantalum (Ta), and Tantalum nitride (TaN).

As described above, the copper coated substrate used in the process of the present invention has been found to be well suited for determining temperatures in an oxidizing atmosphere. Such oxidizing atmospheres are commonly used to conduct various processes on semiconductor wafers in thermal processing chambers. For instance, many processes are carried out in thermal processing chambers wherein an oxidizing gas, such as oxygen, steam or nitrogen oxides, are circulated through the chamber during heat treatment. Preferably, when using the process of the present invention to calibrate temperature sensing devices within a thermal processing chamber, the process of the present invention is carried out under the same conditions that the semiconductor wafers are to be processed. In particular, different gases being circulated through the chamber can have different effects upon temperature. Consequently, it is preferred that the temperature used for calibrating the temperature sensing devices be measured in the same atmosphere that will be used to process the wafers.

Of particular advantage, the process of the present invention is well suited to determining the temperature of substrates in thermal processing chambers in lower temperature ranges, such as less than about 600° C., and particularly from about 400° C. to about 550° C. In the past, difficulties have been experienced in attempting to monitor the temperature of wafers at lower temperatures. For example, pyrometers typically do not work well at temperatures less than 500° C. since the wafers are partially transparent to electromagnetic radiation causing the temperature of the wafer to be difficult to determine.

Besides being well suited to determining the temperature of substrates at temperatures less than about 600° C., the process of the present invention is also well suited for determining the temperature of substrates in an atmosphere containing steam. Recently, oxidation processes using steam have gained in importance. Steam, however, can have a dramatic impact on the manner in which the wafers are heated and on the manner in which the temperatures are monitored. The process of the present invention provides very precise and accurate temperature reference points for calibrating temperature sensing devices contained within the chamber during steam oxidation.

According to the present invention, after the substrate containing the copper coating is placed in the thermal processing chamber and heated, the thickness of the resulting copper oxide is then measured in order to determine the temperature to which the substrate was heated. The manner in which the thickness of the resulting copper oxide coating is measured may vary depending upon the particular application. The measurement may be done while the substrate is contained within the thermal processing chamber or, alternatively, may be performed after the substrate has been removed from the chamber.

For most applications, the thickness of the copper oxide coating should be measured using spectroscopic techniques. For instance, in one embodiment of the present invention, the thickness of the copper oxide coating can be measured using spectroscopic ellipsometry. Ellipsometry is a technique for determining the properties of a material from the polarization characteristics of linearly polarized incident light reflected from the surface of the material. Ellipsometry is well suited for use in the process of the present invention because copper has much different reflectance characteristics in comparison to copper oxides, such as cupric oxide (CuO) and cuprous oxide ($Cu_2O$), especially at wavelengths greater than 5,000 angstroms, and particularly greater than 7,000 angstroms. Similar differences are also observed when comparing the refractive index (n) and the extinction coefficient (k) between copper and copper oxides. Based upon these differences and characteristics, ellipsometry can be used to differentiate between copper and copper oxide for determining the thickness of the copper oxide coating that forms on the copper surface. It should be understood, however, that any other suitable method for determining the thickness of the copper oxide coating can be used in accordance with the present invention.

Once the thickness of the copper oxide coating is determined, the temperature to which the substrate was heated can be easily calculated based upon the amount of time the substrate spent in the chamber. For most applications, the substrate of the present invention should be placed in a thermal processing chamber and heated at a rapid rate until a maximum temperature level is reached. Once heated to the maximum temperature, the substrate is preferably maintained at that temperature for a determined interval of time, such as less than about ten minutes prior to being cooled.

After the substrate is heated, the thickness of the copper oxide coating is determined in order to subsequently determine the temperature to which the wafer was heated. Specifically, predetermined time versus temperature calibration curves can be constructed and used in determining the temperature. For instance, by knowing the thickness of the copper oxide coating and the amount of time the substrate is heated, a temperature can be obtained from a predetermined curve.

Once the temperature of the substrate is determined based upon the thickness of the oxide film, the determined temperature can be used to calibrate temperature sensing devices contained within the thermal processing chamber. For instance, the temperature determined according to the process of the present invention can be used to calibrate thermocouple 60 and/or radiation sensing devices 27 as shown in FIG. 1.

Further, by measuring the thickness of the copper oxide film in multiple locations, the ability of the thermal processing chamber to uniformly heat substrates can also be determined. For example, if the thickness of the copper oxide coating is uniform, then the chamber is heating the substrate uniformly. If the thickness of the copper oxide coating is nonuniform, however, then that may indicate that adjustments need to be made in the heater used to heat the substrate. For example, when using light energy sources as shown in FIG. 1, changes can be made in the irradiance distribution caused by the light energy sources in order to promote greater temperature uniformity.

Besides determining temperatures in oxidizing atmospheres, the present invention is also directed to a process for determining the temperature of substrates in reducing atmospheres. In this embodiment, instead of using a substrate having a copper surface, a substrate is used having a copper oxide surface. When the substrate is placed in a reducing atmosphere and heated, the copper oxide is reduced to copper causing the thickness of the copper oxide coating to decrease. Based upon the amount of time the substrate is heated, the decrease in thickness of the coating can be translated into a temperature to which the substrate was heated. This temperature can then be used to calibrate other temperature sensing devices that may be present within the thermal processing chamber, such as thermocouples and pyrometers.

Reducing atmospheres are sometimes needed in thermal processing chambers to conduct various processes including metallization and sintering. Many of these processes are carried out at temperatures less than about 600° C., making the process of the present invention well suited for making temperature determinations. Reducing atmospheres are created by circulating within the chamber gases such as hydrogen.

The method used to determine how much the copper oxide has decreased in thickness can be the same as described above with respect to measuring temperatures in an oxidizing atmosphere. In particular, spectroscopic ellipsometry can be used to measure the thickness of the oxide coating before and after the substrate has been heated.

The present invention may be better understood with reference to the following examples.

EXAMPLE NO. 1

Figure 2:
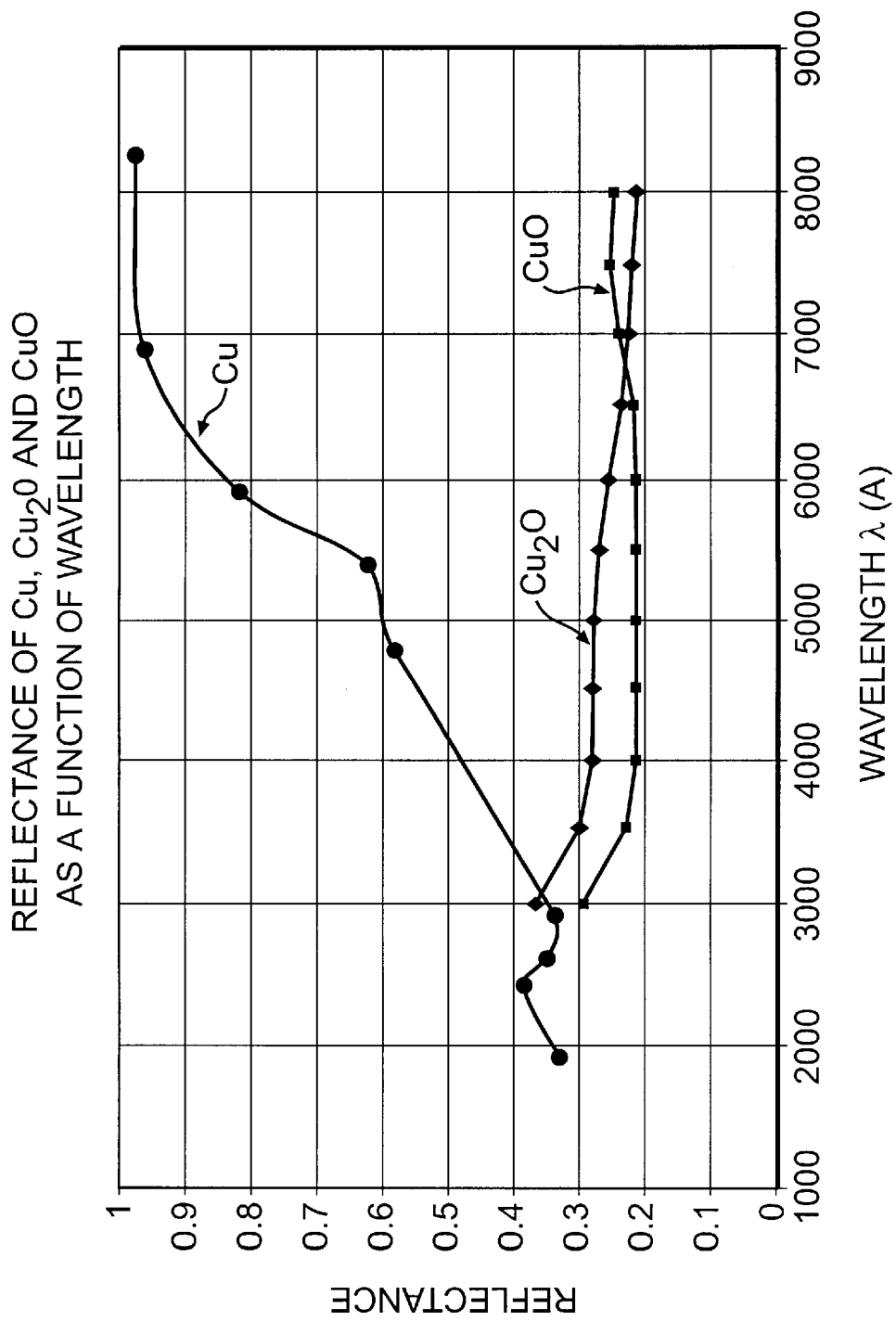
FIG. 2 is graphical representation of the results obtained in Example 1.
Figure 3:
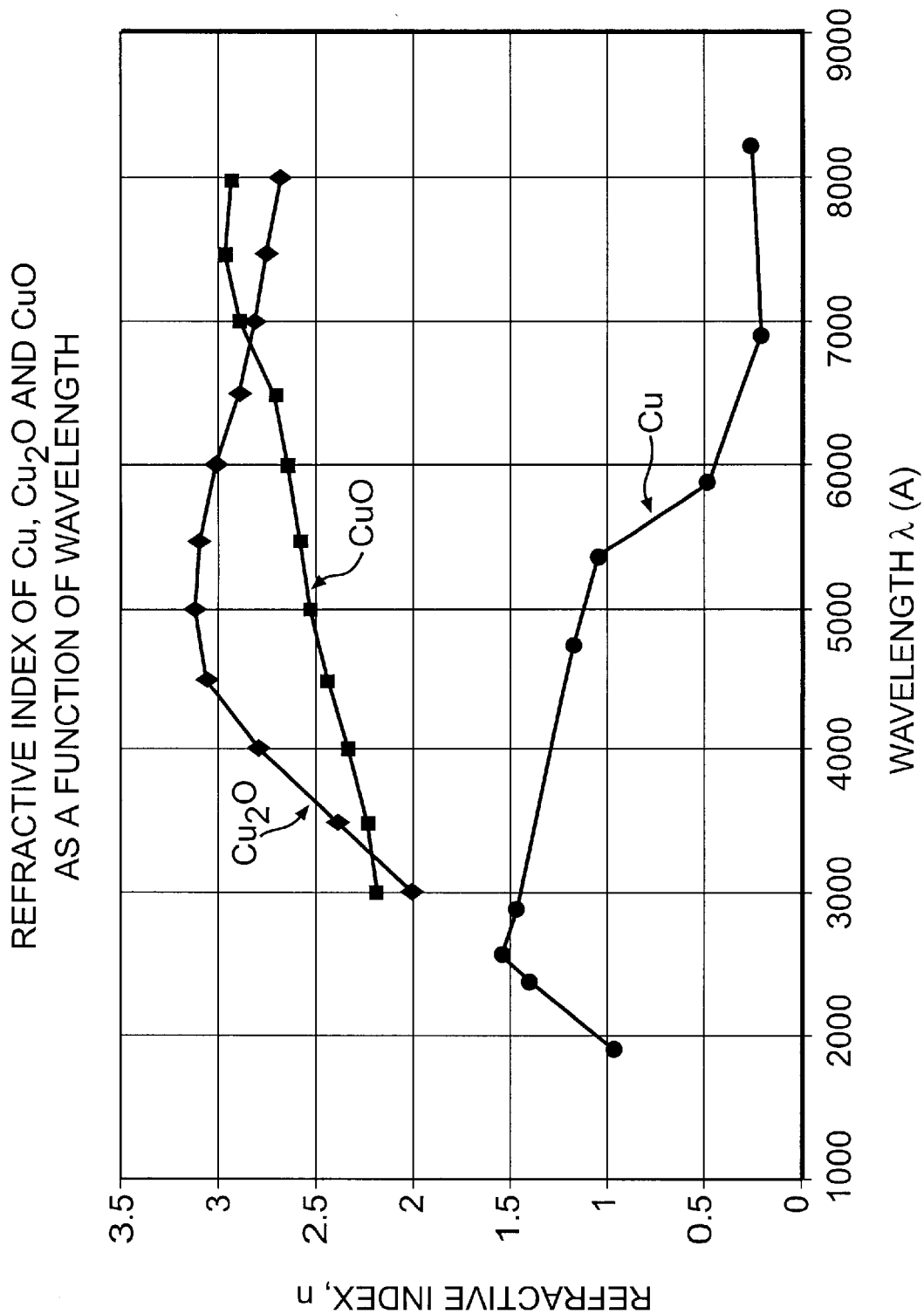
FIG. 3 is a graphical representation of the results obtained in Example 1.
Figure 4:
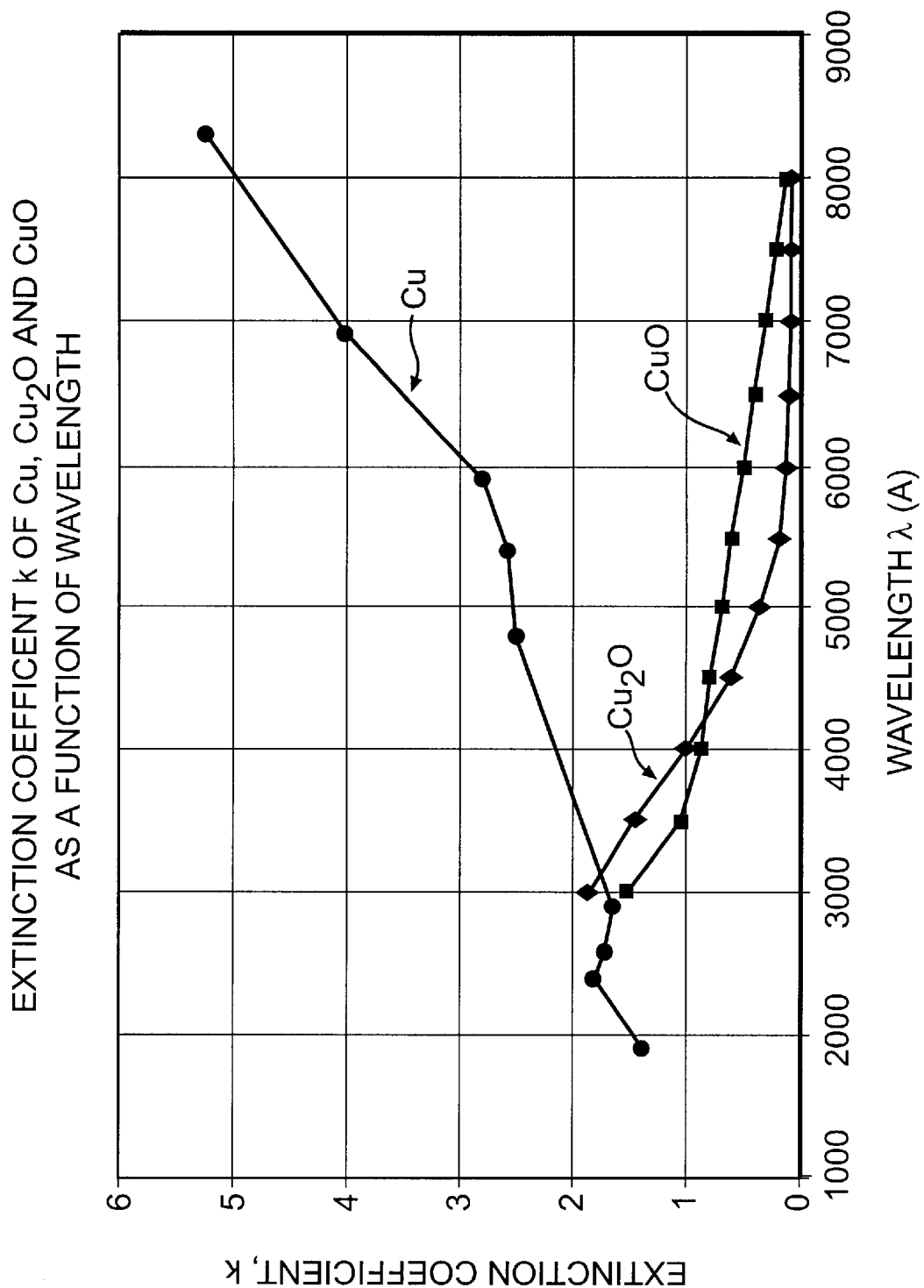
FIG. 4 is a graphical representation of the results achieved in FIG. 1.

The following example was performed in order to demonstrate the differences in the optical properties of copper in comparison to cupric oxide (CuO) and cuprous oxide ($Cu_2O$). Specifically, the reflectance, the refractive index (n), and the extinction coefficient (k) were determined at different wavelengths for copper, cupric oxide and cuprous oxide. The measurements were performed using a spectroscopic ellipsometer. The results are illustrated in FIG. 2, FIG. 3 and FIG. 4.

As shown in the figures, the optical properties of copper are much different than the optical properties of cupric oxide and cuprous oxide, especially at wavelengths greater than about 5,000, and particularly at wavelengths greater than about 7,000.

These differences in optical properties makes it relatively simple to accurately measure the thickness of copper oxide coatings formed upon a copper surface. According to the present invention, since the thickness of such coatings can be easily and precisely determined, temperatures calculated in accordance with the present invention can also be easily and accurately determined.

EXAMPLE NO. 2

The following example is directed to one embodiment for deriving time and temperature graphs in relation to copper oxide thicknesses. Once constructed, the graphs can then be used to determine temperatures based upon coating thicknesses in accordance with the present invention.

In this experiment, a copper coating having a thickness of 8,000 angstroms was placed on silicon wafers having a diameter of 8 inches. The copper coated substrates were placed in a thermal processing chamber and heated to different temperatures and for different times. Specifically, some wafers were heated for 60 seconds at various temperatures in the presence of oxygen gas and, alternatively, steam. The oxygen gas and steam were fed to the chamber at a volumetric flow rate of 3 liters per minute. The oxygen gas and steam created an oxidizing ambient.

Another set of wafers were heated to 400° C. for different periods of time in the presence of a gas containing molecular oxygen.

While the wafers were being processed, the temperature of the wafers were determined by precalibrated controls.

While the substrates were being heated, a portion of the copper coating was converted into a copper oxide. The thickness of the copper oxide film that formed on the substrate was then measured at different locations on the substrate using spectroscopic ellipsometry at a wavelength of 2,000 to 8,000 angstroms.

Figure 5:
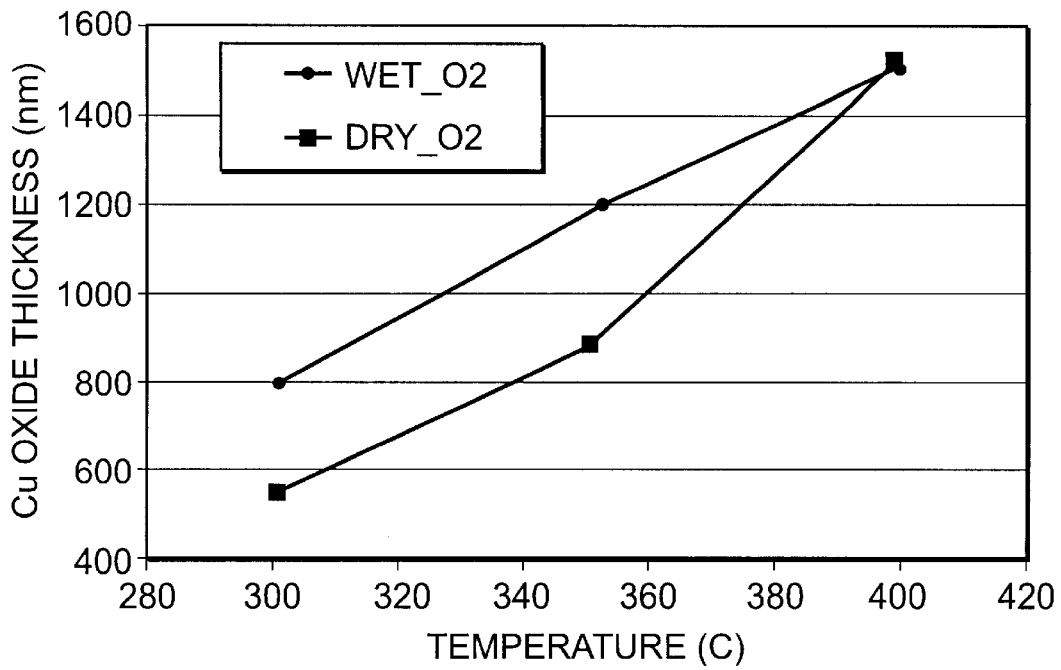
FIG. 5 is a graphical representation of the results obtained in Example 2.
Figure 6:
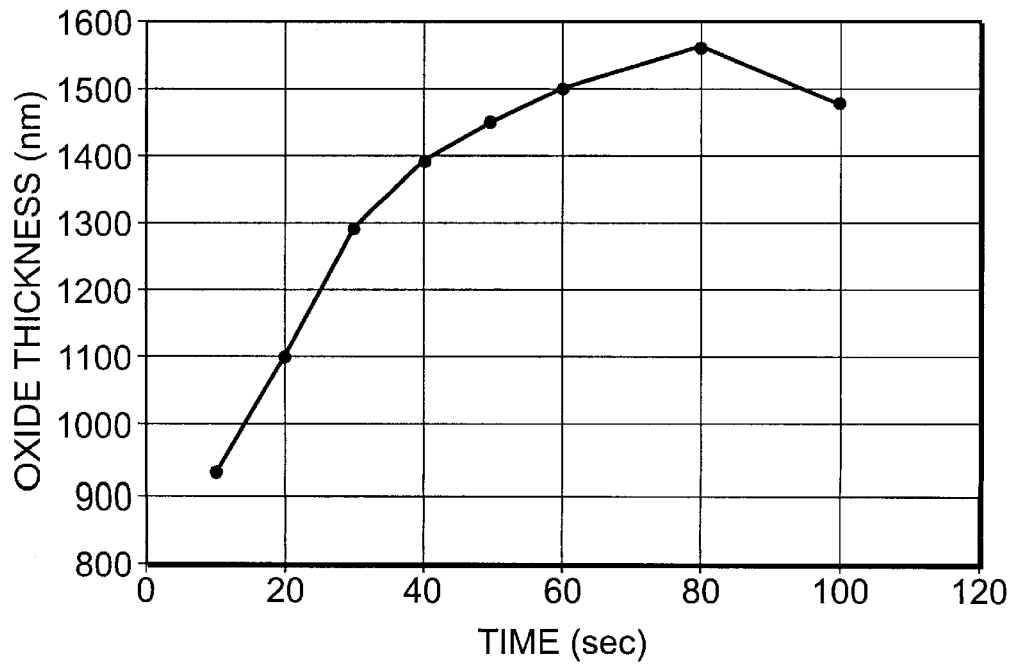
FIG. 6 is a graphical representation of the results obtained in example 2.

Referring to FIGS. 5 and 6, results of this example are illustrated. As shown, graphs were constructed showing the relationship between temperature and copper oxide thickness when the wafers were heated to a preset amount of time (FIG. 5) and showing the relationship between time and oxide thickness when heated to a preset temperature (FIG. 6). FIG. 5 also illustrates the differences that result when the oxidizing atmosphere within the chamber is changed.

The graphs illustrated in FIGS. 5 and 6 provide calibration curves that can be used to determine temperatures when other copper coated wafers are processed. For example, if a copper coated wafer was heated for 60 seconds to an unknown temperature, the temperature could be determined by measuring the thickness of the coating and obtaining a temperature from the graph illustrated in FIG. 5.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A process for measuring the temperature of substrates in a thermal processing chamber comprising the steps of:
    placing a substrate in a thermal processing chamber, said substrate including a surface made from a material comprising copper;
    heating said substrate within said thermal processing chamber for a determined interval of time in the presence of an oxidizing atmosphere, said substrate being heated to a temperature sufficient to form a coating of oxidized copper on said surface of said substrate;
    measuring the thickness of said oxidized copper coating on said substrate; and
    determining a temperature within said thermal processing chamber while said substrate was heated from the measured thickness of said oxidized copper coating.

2. A process as defined in claim 1, wherein said substrate comprises a semiconductor wafer having a copper coating adhered to a surface of said wafer.

3. A process as defined in claim 2, wherein said copper coating has a thickness of at least 2,000 angstroms.

4. A process as defined in claim 1, wherein said substrate is heated within said thermal processing chamber by light energy.

5. A process as defined in claim 1, wherein said substrate is heated to a temperature of less than about 600° C.

6. A process as defined in claim 1, wherein said oxidizing atmosphere contains steam.

7. A process as defined in claim 1, wherein said oxidizing atmosphere contains oxygen gas.

8. A process as defined in claim 1, wherein said substrate is heated to a predetermined temperature and maintained at said predetermined temperature for said interval of time in forming said oxidized copper coating on said substrate.

9. A process as defined in claim 1, wherein said thickness of said oxidized coating is measured using spectroscopic ellipsometry.

10. A process for measuring the temperature of a substrate in a thermal processing chamber comprising the steps of:
    placing a substrate in a thermal processing chamber, said substrate including a coating made from a material comprising an oxidized copper, said coating having a determined thickness;
    heating said substrate within said thermal processing chamber for a determined interval of time in the presence of a reducing atmosphere, said substrate being heated to a temperature sufficient to reduce a portion of said oxidized copper thereby reducing the thickness of said oxidized copper coating on said substrate;
    measuring the reduction of thickness of said oxidized copper coating on said substrate; and
    determining a temperature within said thermal processing chamber while said substrate was heated from the measured thickness reduction of said oxidized copper coating.

11. A process as defined in claim 10, wherein said reducing atmosphere contains hydrogen gas.

12. A process as defined in claim 10, wherein said substrate is heated within said thermal processing chamber by light energy.

13. A process as defined in claim 10, wherein said substrate is heated to a predetermined temperature and maintained at said predetermined temperature for said interval of time in reducing said oxidized copper contained in said coating on said substrate.

14. A process as defined in claim 10, wherein the reduction in thickness of said oxidized copper coating is measured using spectroscopic ellipsometry.

15. A process as defined in claim 10, wherein said substrate comprises a semiconductor wafer.

16. A process as defined in claim 10, wherein said substrate is heated to a temperature less than about 600° C.

17. A process for calibrating a temperature sensing device in a thermal processing chamber comprising the steps of:

providing a thermal processing chamber, said thermal processing chamber containing a temperature sensing device for monitoring the temperature of a semiconductor wafer placed in said chamber, said thermal processing chamber being in communication with a plurality of light energy sources for heating semiconductor wafers contained in said chamber;

placing a substrate in said thermal processing chamber, said substrate including a surface made from a material comprising copper;

heating said substrate within said thermal processing chamber for a determined interval of time in the presence of an oxidizing atmosphere, said substrate being heated to a temperature sufficient to form a coating of oxidized copper on said surface of said substrate;

measuring the thickness of said oxidized copper coating on said substrate;

determining a temperature within said thermal processing chamber while said substrate was heated from the measured thickness of said oxidized copper coating; and calibrating said temperature sensing device contained in said thermal processing chamber based upon said determined temperature.

18. A process as defined in claim 17, wherein said temperature sensing device comprises a thermocouple.

19. A process as defined in claim 17, wherein said substrate comprises a semiconductor wafer having a copper coating adhered to a surface of said wafer.

20. A process as defined in claim 19, wherein said copper coating has a thickness of at least 2,000 angstroms.

21. A process as defined in claim 17, wherein said substrate is heated to a temperature of less than about 600° C.

22. A process as defined in claim 17, wherein said oxidizing atmosphere contains steam.

23. A process as defined in claim 17, wherein said oxidizing atmosphere contains oxygen gas.

24. A process as defined in claim 17, wherein said temperature sensing device comprises a pyrometer.

25. A process as defined in claim 17, wherein said thickness of said oxidized coating is measured using spectroscopic ellipsometry.

26. A process as defined in claim 25, wherein said thickness of said oxidized copper coating is measured at multiple locations in order to determine temperature uniformity across the surface of said substrate when the substrate was heated.

27. A process for calibrating a temperature sensing device in a thermal processing chamber comprising the steps of:

providing a thermal processing chamber, said thermal processing chamber containing a temperature sensing device for monitoring the temperature of a semiconductor wafer placed in said chamber, said thermal processing chamber being in communication with a plurality of light energy sources for heating semiconductor wafers contained in said chamber;

placing a substrate in said thermal processing chamber, said substrate including a surface made from a material comprising an oxidized copper coating, said coating having a determined thickness;

heating said substrate within said thermal processing chamber for a determined interval of time in the presence of a reducing atmosphere, said substrate being heated to a temperature sufficient to reduce a portion of said oxidized copper thereby reducing the thickness of said oxidized copper coating on said substrate;

measuring the reduction of thickness of said oxidized copper coating on said substrate;

determining a temperature within said thermal processing chamber while said substrate was heated from the measured reduction of said oxidized copper coating; and calibrating said temperature sensing device contained in said thermal processing chamber based upon said determined temperature.

28. A process as defined in claim 27, wherein said temperature sensing device comprises a thermocouple.

29. A process as defined in claim 27, wherein said substrate comprises a semiconductor wafer having an oxidized copper coating adhered to a surface of said wafer.

30. A process as defined in claim 29, wherein said oxidized copper coating has a thickness of at least 2,000 angstroms.

31. A process as defined in claim 27, wherein said substrate is heated to a temperature of less than about 600° C.

32. A process as defined in claim 27, wherein said reducing atmosphere contains hydrogen.

33. A process as defined in claim 27, wherein said temperature sensing device comprises a pyrometer.

34. A process as defined in claim 27, wherein said reduction in thickness of said oxidized copper coating is measured using spectroscopic ellipsometry.

35. A process as defined in claim 34, wherein said reduction in thickness of said oxidized copper coating is measured at multiple locations in order to determine temperature uniformity across the surface of said substrate when the substrate was heated.

* * * * *